Sept. 8, 1936. K. M. KEITH ET AL 2,053,796
GRAIN DRILL HOPPER
Original Filed July 8, 1935
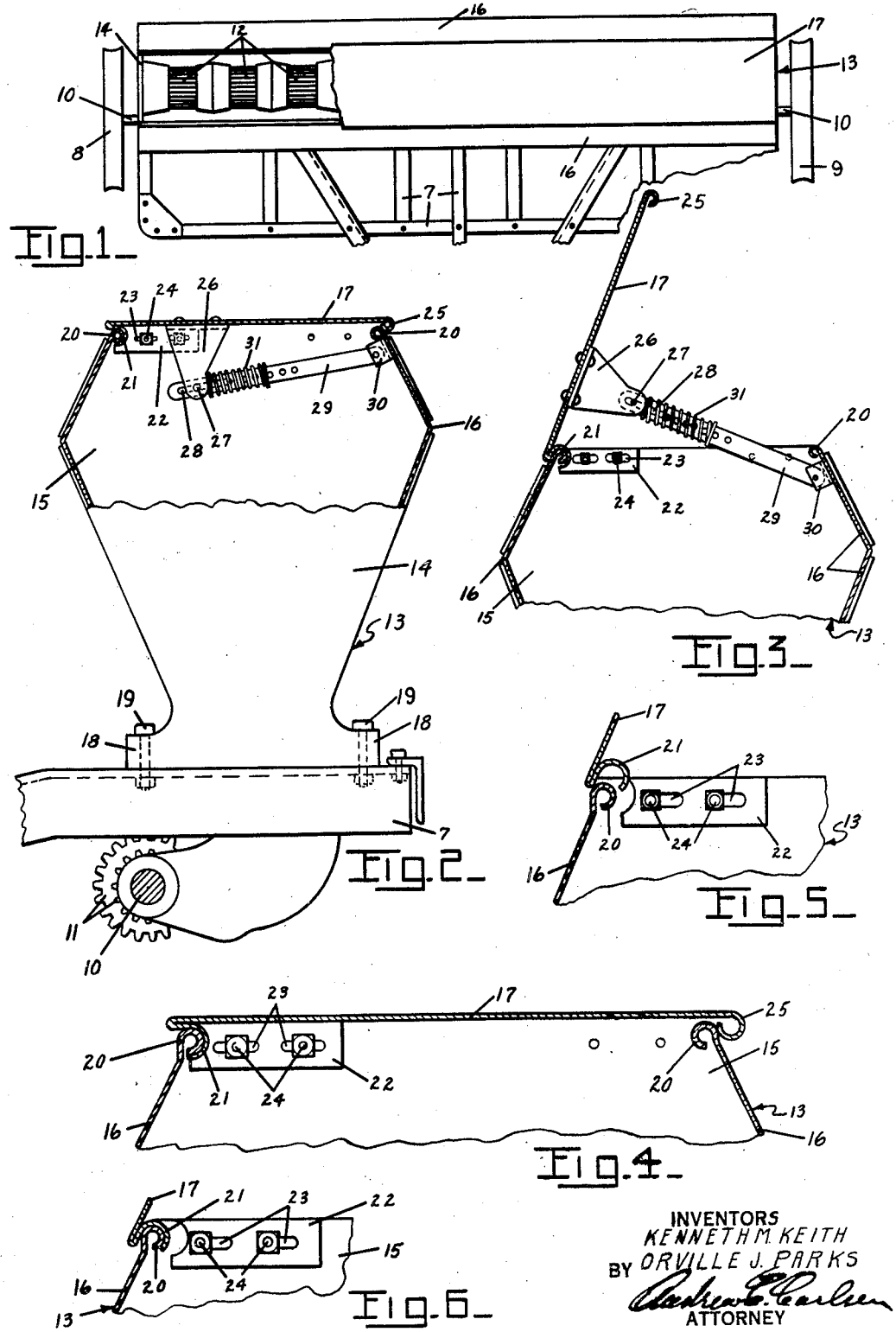
INVENTORS
KENNETH M. KEITH
BY ORVILLE J. PARKS
ATTORNEY Patented Sept. 8, 1936

2,053,796

UNITED STATES PATENT OFFICE 2,053,796

GRAIN DRILL HOPPER

Kenneth M. Keith, Minneapolis, and Orville J. Parks, Hopkins, Minn., assignors to Minneapolis-Moline Power Implement Company, Minneapolis, Minn., a corporation of Delaware Original application July 8, 1935, Serial No. 30,240. Divided and this application December 23, 1935, Serial No. 55,856

8 Claims. (Cl. 111—1)

This invention relates to grain drills and the primary object is to provide a grain drill with an end to end reversible hopper, which in turn has a detachable and reversible cover, to the end that certain adjustments can be made, depending upon the position of the operator and the mode of propulsion to be employed in moving the machine over the field. Thus if the machine is to be tractor pulled the operator of the tractor will ordinarily also operate the drill; and as such tractor operator will be stationed in advance of the drill it is highly desirable to have the parts so arranged that observations and adjustments may be made from that position. On the other hand, if the machine is to be horse drawn the driver, who will also operate the drill, will invariably be positioned rearwardly of the drill hopper, thus necessitating the provisions of observation and control from that direction. These circumstances also require, at least in most instances, the provision for reversibility of feed mechanism drive connections and other devices which form the subject matter of our copending and parent application Ser. No. 30,240, filed July 8th, 1935, for Grain drill, of which the present application is a division, and to which parent application attention is directed for a more complete exposition of the entire invention as a whole.

In the drawing of the present application, which drawing illustrates a preferred embodiment of the more limited concept or part of the complete machine:

Fig. 1 is a top or plan view of a grain drill employing the reversible hopper and cover feature, fractional portions being broken away for purpose of illustration.

Fig. 2 is an enlarged detail end view of the hopper and a portion of the frame, with the hopper partly in section and the cover thereof closed.

Fig. 3 is a sectional elevation corresponding to the upper portion of Fig. 2, but showing the cover open.

Fig. 4 is an enlarged section through the cover and adjacent hopper parts.

Figs. 5 and 6 are sectional detail views illustrating the releasable cover attaching device.

Referring to the drawing more particularly and by reference characters, 7 designates the main frame work of the machine, the same being supported on right and left ground wheels 8 and 9 having axles 10. The axles have spur gears, such as 11, which drive feed rolls 12 of grain hopper 13, through drive mechanisms such as illustrated in detail in our copending patent applications Ser. No. 30,240 and Ser. No. 33,680.

The hopper 13 is of the transversely extending, elongated type having end walls 14, partition walls 15, angular side walls 16, and cover 17. The lower portions of the side walls converge downwardly toward discharge openings, spaced longitudinally of the hopper, so that the grain will flow into contact with the feed rolls 12. At its ends the hopper is provided with laterally (front and rear) projecting lugs 18 which are rigidly secured to side beams of the frame 7 by bolts 19. The bolt holes in the hopper and frame are similarly spaced, at both sides of the machine, so that the hopper may be removed, reversed end for end, and resecured by the same bolts; and in such a manner that feed transmission connections may be established when the hopper is in either of such reversed positions.

It may here be explained that the primary reason for so reversing the hopper is to reverse the direction of the feed sight openings of the feed cups (not shown) which connect the hopper openings to the discharge or feed tubes below the feed rolls 12. The feed cup openings all face in one direction, and when the machine is tractor propelled the operator, being positioned in front of the hopper, desires the openings to face forwardly so that he may observe the feed process and effect clearances or adjustments when the grain feed is too slow or too fast, or when for instance one or more of the feed openings should become clogged. On the other hand, when the machine is converted to horse drawn use the operator will invariably walk or ride behind the hopper, and at such time it becomes necessary to reverse the hopper so that the feed cups attached thereunder will open rearwardly, whereupon seed feed observations may be made from the rear.

Reversing the hopper in the manner and for the reasons above noted, however, gives rise to another difficulty, namely, that unless provision is otherwise made the cover 17, which hinges at one of its longitudinal edges, opens rearwardly in one instance, and forwardly in the other. This is objectionable because the hopper must of course be frequently resupplied with grain and this is invariably done by shovelling or otherwise filling in the seed from a wagon or other receptacle at the rear of the drill. For this reason it is desirable to mount the cover so that it may always be opened rearwardly (i. e., by swinging upwardly and forwardly). To overcome the stated objection we make provision whereby the cover may be interchangeably hinged to either of the hopper walls, depending upon which is in the rear, and this is done in the following manner:

The upper edge portions of the front and rear walls 16 of the hopper 13 are formed with integral flange beads 20 which, in addition to reinforcing such walls, are circular in cross section to serve as bearing pintles or tubes for an open sleeve 21 formed by a reversely curved, longitudinal edge portion of the cover 17. This hinge sleeve 21 has a longitudinal opening of slightly lesser size than the outside diameter of the beads 20, but the resiliency of the material permits the sleeve to be pressed down with a snap action over the bead, and when so secured obviously provides a very efficient and practical hinge connection for the cover. To further insure retention of the connection, however the cross partitions 15 in the hopper may be provided with small retention blocks 22, having slots 23 through which pass securing bolts 24. These blocks have adjustable end engagement with the sleeve 21, as shown in Figs. 2, 3, and 4, but may be withdrawn therefrom, without removal, to permit application or removal of the cover, as indicated in Figs. 5 and 6. The swinging or rear edge of the cover has a reenforcing bead 25 which preferably closes over the adjacent hopper bead 20.

The cover 17 is releasably secured in opened and closed position by spring devices, one of which is shown in Figs. 2 and 3, and which includes a bracket arm 26 secured to the inner face of the cover and having a pin 27 for sliding engagement in a slot 28 of a link bar 29 pivoted to a lug 30 on the rear wall of the hopper. A spring 31 encircling the bar and adjustable with respect thereto presses against the bracket arm 26, and as the cover movements raise or lower the pin 27 with respect to the dead center between 20 and 30 the spring will act to releasably hold the cover open or closed.

When the cover is to be reversed on the hopper the blocks 22 and lugs 30 are removed and reapplied at the opposite sides, and to this end the partitions 15 may be provided with full holes to accommodate the reapplied block bolts 24, but the new or second position holes, for the bolts of lugs 30, are preferably only half punched out, and such holes are then completely opened when the change is actually to be made.

The significance of the reversibility features thus described is of substantial importance because it enables the conversion or transposition to be effected with a minimum amount of time and effort and without the need of any skilled help in doing so. Any farmer owning the machine and desiring to convert it from tractor to horse drawn use, or vice versa, can do so without the aid of factory help or additional appliances.

From the foregoing specification, considered in connection with the drawings, the structure, function, operation, and advantages of the machine and its various features will no doubt be readily understood. It is further understood, however, that the disclosure thus made is only representative of a preferred embodiment of the invention, and various changes and modifications may be made without departing from the spirit and scope of the appended claims.

Having now therefore fully shown and described our invention, what we claim to be new and desire to protect by Letters Patent is:

1. A grain drill comprising a wheel supported frame, a transversely extended elongated hopper securable on the frame selectively in end to end reversible positions, a cover for the hopper, and releasable means for hingedly securing the cover to front and rear walls of the hopper selectively.

2. A grain drill comprising a wheel supported frame, a reversible hopper mounted on the frame, a cover for the hopper, the upper edges of the front and rear walls of the hopper having beads forming pintle bearings, and the cover being provided at one edge with a resilient, longitudinally opened sleeve adapted to be removably secured on either of such beads to form a hinge connection for the cover.

3. A grain drill comprising a wheel supported frame, a transversely extending elongated hopper carried on the frame, means for securing the hopper on the frame selectively in end to end reversible positions, a cover for the hopper, and means for securing the cover to the hopper in such a manner that the cover may be opened rearwardly when the hopper is in either one of its said positions.

4. A grain drill comprising a wheel supported frame, a transversely extending elongated hopper carried on the frame, means for securing the hopper on the frame selectively in end to end reversible positions, the front and rear walls of the hopper being provided at their upper edges with hinge members, a cover for the hopper and being provided adjacent one edge with hinge members for cooperating engagement with the hinge members of either of said hopper walls selectively.

5. A grain drill comprising a wheel supported frame, a transversely extending elongated hopper carried on the frame, means for securing the hopper on the frame selectively in end to end reversible positions, the front and rear walls of the hopper being provided at their upper edges with hinge members, a cover for the hopper and being provided adjacent one edge with hinge members for cooperating engagement with the hinge members of either of said hopper walls selectively, the hinge members of the hopper walls forming pintles and the cooperating hinge members of the cover being longitudinally open sleeves adapted to be frictionally and releasably secured about such pintles.

6. The combination with a grain drill hopper, the same being provided at one upper edge with a pintle, of a cover for closing the hopper, said cover having a sleeve along one edge thereof for turning movement on the pintle, said sleeve having a longitudinal opening for radially receiving the pintle and being formed of resilient material so as to releasably engage the pintle and removably maintain the latter therein.

7. A grain drill hopper having a swingable cover, cooperating, separable hinge members for releasably securing the cover to the hopper, and adjustable means carried by the hopper for lateral contact with the hinge members to prevent the separation thereof, said adjustable means comprising slotted members slidably and adjustably secured to the hopper by bolts extending through the slots and through adjacent hopper portions.

8. A grain drill hopper having a pintle adjacent an opening therein, a cover for closing the opening, said cover having an open sleeve at one edge for radially receiving the pintle and for turning movement thereon, and a member releasably secured to the hopper for contact with the sleeve to prevent removal thereof from the pintle.

KENNETH M. KEITH.
ORVILLE J. PARKS.